(12) United States Patent
Ishiguro et al.

(10) Patent No.: US 7,675,656 B2
(45) Date of Patent: Mar. 9, 2010

(54) IMAGE READING APPARATUS FOR DETECTING NOISE IN IMAGE DATA

(75) Inventors: Kazuhiro Ishiguro, Toyohashi (JP); Hiroyuki Suzuki, Toyokawa (JP); Hideyuki Toriyama, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1112 days.

(21) Appl. No.: 11/012,184

(22) Filed: Dec. 16, 2004

(65) Prior Publication Data

US 2006/0072826 A1 Apr. 6, 2006

(30) Foreign Application Priority Data

Sep. 30, 2004 (JP) .............................. 2004-285829

(51) Int. Cl.
*H04N 1/46* (2006.01)
*H04N 1/38* (2006.01)

(52) U.S. Cl. ........................................ 358/514; 358/463

(58) Field of Classification Search ................ 358/463, 358/464, 514; 382/199, 266, 275
See application file for complete search history.

(56) References Cited

U.S. PATENT DOCUMENTS

| | | | |
|---|---|---|---|
| 4,980,760 A | 12/1990 | Hiratsuka et al. | |
| 5,317,420 A | 5/1994 | Kuwahara | |
| 5,850,293 A | 12/1998 | Suzuki et al. | |
| 5,982,946 A | 11/1999 | Murakami | |
| 6,125,213 A | 9/2000 | Morimoto | |
| 6,215,512 B1 | 4/2001 | Imaizumi et al. | |
| 6,323,959 B1 | 11/2001 | Toyama et al. | |
| 6,441,915 B1 | 8/2002 | Imaizumi et al. | |
| 6,625,331 B1 | 9/2003 | Imaizumi et al. | |
| 6,631,207 B2 | 10/2003 | Hirota et al. | |
| 6,728,418 B1 | 4/2004 | Kumagai et al. | |
| 6,778,297 B1 | 8/2004 | Fujiwara | |
| 6,806,902 B1 | 10/2004 | Donovan | |
| 7,046,861 B2 | 5/2006 | Imaizumi et al. | |

(Continued)

FOREIGN PATENT DOCUMENTS

EP 0270090 9/1993

(Continued)

OTHER PUBLICATIONS

Japanese Office Action dated Oct. 17, 2006, directed to counterpart Jp Application No. 2004-285829.

(Continued)

*Primary Examiner*—Douglas Q Tran

(57) ABSTRACT

An image reading apparatus includes: three line sensors mutually spaced in a sub scanning direction; a platen arranged between the original and the three line sensors; a mover moving the platen relative to the three line sensors at a rate relative to the three line sensors, the rate being different from that of the original relative to the three line sensors; a lightness difference detector extracting a feature pixel having a predetermined feature from each of three data output from the three line sensors; and NOR and AND devices comparing the three data corresponding to a single location on the original to detect the feature pixel extracted from one of the three data, as a noise pixel if the feature pixel is not a feature pixel for the other data.

8 Claims, 11 Drawing Sheets

U.S. PATENT DOCUMENTS

| | | | |
|---|---|---|---|
| 7,072,075 B2 * | 7/2006 | Kondo et al. | 358/1.9 |
| 7,079,685 B1 | 7/2006 | Hirota et al. | |
| 7,283,164 B2 * | 10/2007 | Kakarala et al. | 348/246 |
| 7,382,406 B2 | 6/2008 | Higuchi | |
| 2001/0026380 A1 * | 10/2001 | Imoto | 358/496 |
| 2002/0136463 A1 | 9/2002 | Akahori et al. | |
| 2006/0066915 A1 | 3/2006 | Saka et al. | |
| 2006/0066916 A1 | 3/2006 | Ishiguro et al. | |
| 2006/0066917 A1 | 3/2006 | Ishiguro et al. | |
| 2006/0066918 A1 | 3/2006 | Ishiguro et al. | |
| 2006/0066919 A1 | 3/2006 | Saka et al. | |
| 2006/0066920 A1 | 3/2006 | Saka et al. | |
| 2006/0066921 A1 | 3/2006 | Saka et al. | |
| 2006/0072169 A1 | 4/2006 | Ishiguro et al. | |
| 2006/0098248 A1 | 5/2006 | Suzuki et al. | |

FOREIGN PATENT DOCUMENTS

| | | |
|---|---|---|
| JP | 63-141455 | 6/1988 |
| JP | 1-309467 | 12/1989 |
| JP | 05-324812 | 12/1993 |
| JP | 9-139844 | 5/1997 |
| JP | 10-228536 | 8/1998 |
| JP | 11-266373 | 9/1999 |
| JP | 2000-278485 | 10/2000 |
| JP | 2000-287031 A | 10/2000 |
| JP | 2000324312 | 11/2000 |
| JP | 2001-103249 | 4/2001 |
| JP | 2001-272829 | 10/2001 |
| JP | 2002-77584 | 3/2002 |
| JP | 2002-185767 | 6/2002 |
| JP | 2002-271631 | 9/2002 |
| JP | 2002-354262 | 12/2002 |
| JP | 2003-8846 | 1/2003 |
| JP | 2003-259096 | 9/2003 |
| JP | 2003-315933 | 11/2003 |
| JP | 2004-112611 | 4/2004 |
| JP | 2004-112645 | 4/2004 |

OTHER PUBLICATIONS

U.S. Appl. No. 11/012,231, filed Dec. 16, 2004, Ishiguro et al.
U.S. Appl. No. 11/019,520, filed Dec. 23, 2004, Ishiguro et al.
U.S. Appl. No. 11/019,181, filed Dec. 23, 2004, Ishiguro et al.
U.S. Appl. No. 11/017,662, filed Dec. 22, 2004, Ishiguro et al.
U.S. Appl. No. 11/019,712, filed Dec. 23, 2004, Saka et al.
U.S. Appl. No. 11/020,209, filed Dec. 27, 2004, Saka et al.
U.S. Appl. No. 11/020,233, filed Dec. 27, 2004, Saka et al.
U.S. Appl. No. 11/020,479, filed Dec. 27, 2004, Saka et al.
U.S. Appl. No. 11/020,232, filed Dec. 27, 2004, Suzuki et al.
Japanese Office Action mailed on Oct. 28, 2008 directed towards foreign application No. 2004-286214; 4 pages.
Japanese Notice of Grounds of Rejection, mailed on Feb. 10, 2009, directed to Japanese Patent Application No. 2004-326869; 4 pages.
Ishiguro et al., U.S. Office Action, mailed May 12, 2008, directed to U.S. Appl. No. 11/012,231; 27 pages.
Ishiguro et al., U.S. Office Action, mailed Nov. 20, 2008, directed to U.S. Appl. No. 11/012,231; 28 pages.
Ishiguro et al., U.S. Office Action, mailed Jun. 26, 2009, directed to U.S. Appl. No. 11/012,231; 6 pages.
Ishiguro et al., U.S. Office Action, mailed Oct. 25, 2007, directed to U.S. Appl. No. 11/019,520; 9 pages.
Ishiguro et al., U.S. Office Action, mailed Sep. 12, 2008, directed to U.S. Appl. No. 11/017,662; 18 pages.
Ishiguro et al., U.S. Office Action, mailed Apr. 24, 2009, directed to U.S. Appl. No. 11/017,662; 24 pages.
Ishiguro et al., U.S. Office Action, mailed Sep. 23, 2008, directed to U.S. Appl. No. 11/019,181; 13 pages.
Ishiguro et al., U.S. Office Action, mailed Apr. 13, 2009, directed to U.S. Appl. No. 11/019,181; 14 pages.
Saka et al., U.S. Office Action, mailed May 22, 2008, directed to U.S. Appl. No. 11/019,712; 28 pages.
Saka et al., U.S. Office Action, mailed Nov. 10, 2008, directed to U.S. Appl. No. 11/019,712; 36 pages.
Saka et al., U.S. Office Action, mailed Apr. 22, 2009, directed to U.S. Appl. No. 11/019,712; 27 pages.
Saka et al., U.S. Office Action, mailed Jul. 3, 2008, directed to U.S. Appl. No. 11/020,209; 31 pages.
Saka et al., U.S. Office Action, mailed Jan. 27, 2009, directed to U.S. Appl. No. 11/020,209; 30 pages.
Saka et al., U.S. Office Action, mailed Jun. 29, 2009, directed to U.S. Appl. No. 11/020,209; 31 pages.
Suzuki et al., U.S. Office Action, mailed May 23, 2008, directed to U.S. Appl. No. 11/020,232; 19 pages.
Suzuki et al., U.S. Office Action, mailed Nov. 13, 2008, directed to U.S. Appl. No. 11/020,232; 22 pages.
Suzuki et al., U.S. Office Action, mailed May 18, 2009, directed to U.S. Appl. No. 11/020,232; 6 pages.
Saka et al., U.S. Office Action, mailed Jul. 2, 2008, directed to U.S. Appl. No. 11/020,479; 31 pages.
Saka et al., U.S. Office Action, mailed Jan. 22, 2009, directed to U.S. Appl. No. 11/020,479; 31 pages.
Saka et al., U.S. Office Action, mailed May 14, 2009, directed to U.S. Appl. No. 11/020,479; 34 pages.

* cited by examiner

F I G. 1
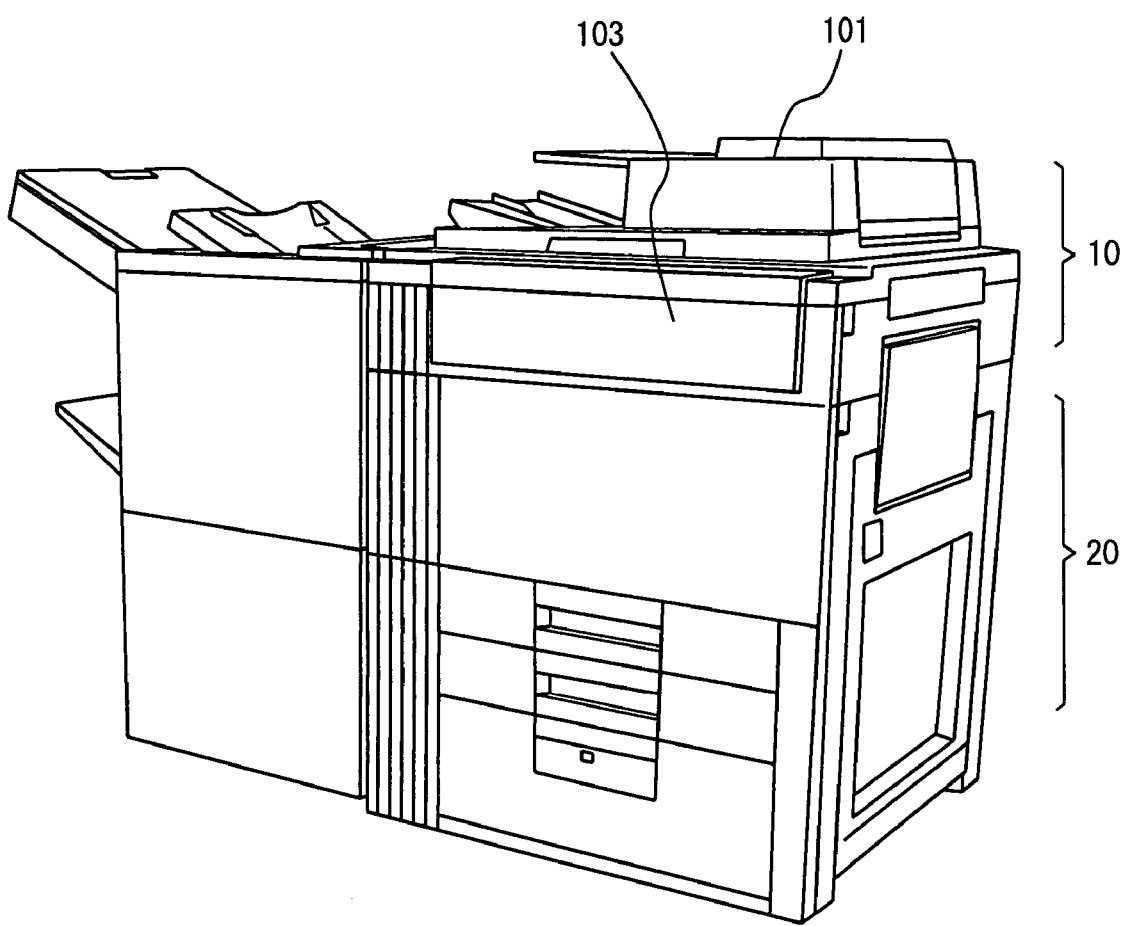

F I G. 3
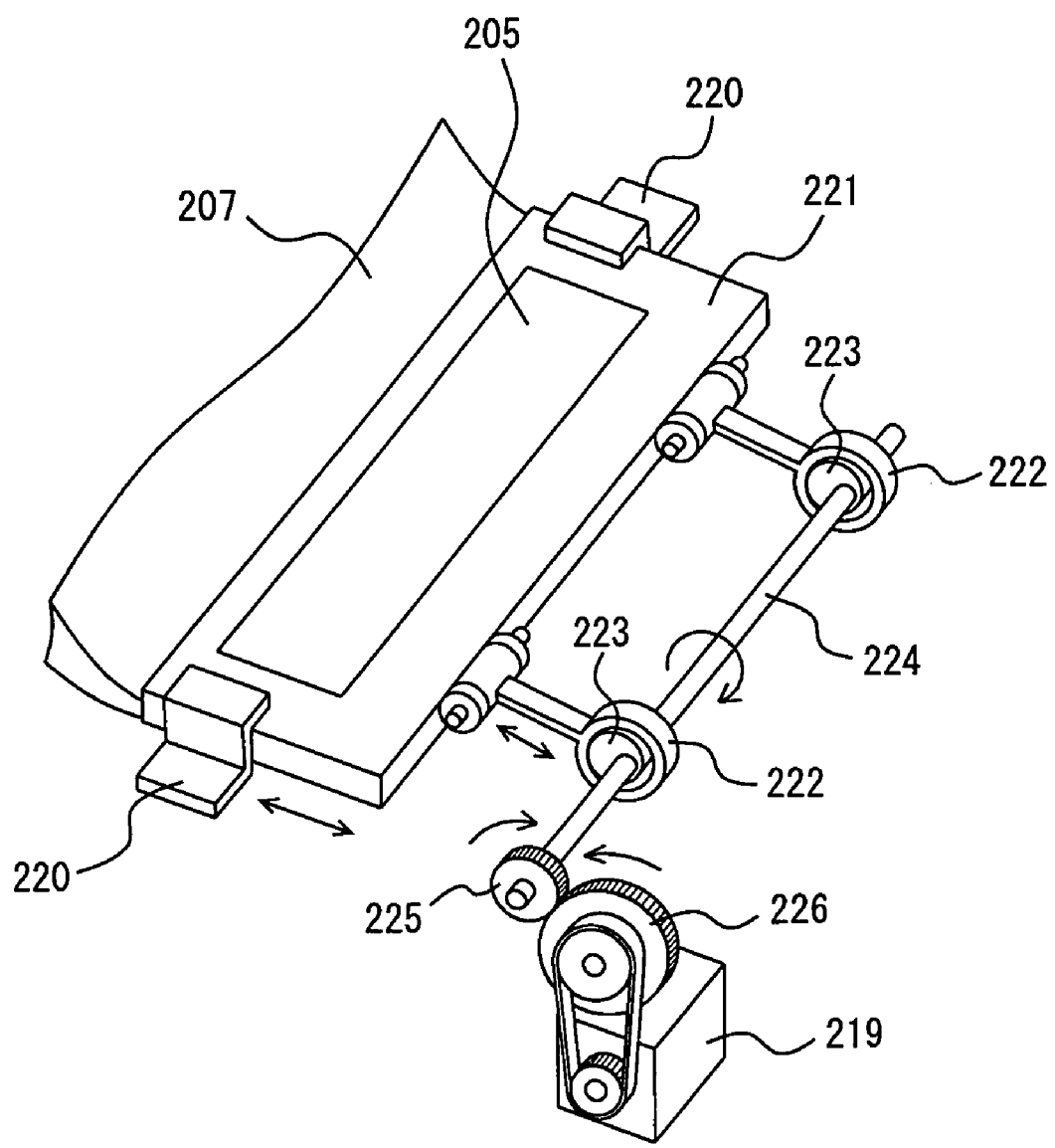

F I G. 6
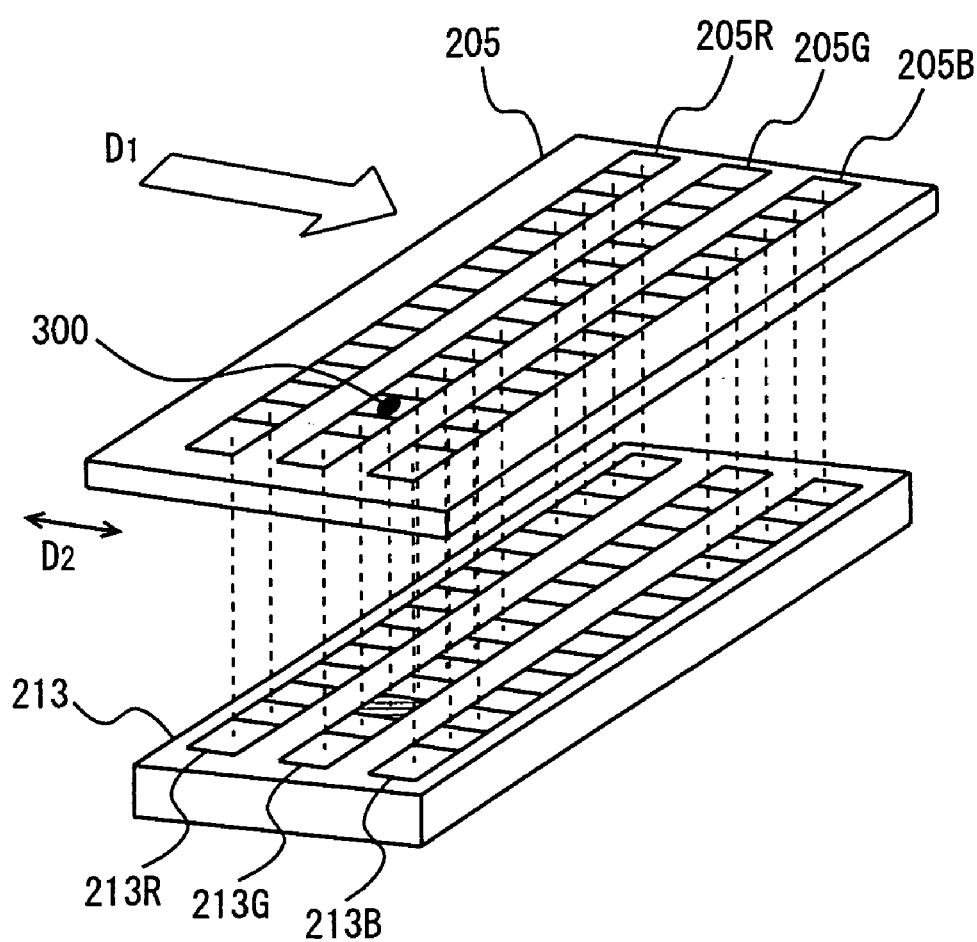

FIG. 10A
FIG. 10B
| C | C | C |
|---|---|---|
| C | A | C |
| C | C | C |
FIG. 10C
FIG. 10D
| C | C | C | C | C |
|---|---|---|---|---|
| C | B | B | B | C |
| C | B | A | B | C |
| C | B | B | B | C |
| C | C | C | C | C |
FIG. 10E
FIG. 10F
| C | C | C | C | C | C | C |
|---|---|---|---|---|---|---|
| C | B | B | B | B | B | C |
| C | B | B | B | B | B | C |
| C | B | B | A | B | B | C |
| C | B | B | B | B | B | C |
| C | B | B | B | B | B | C |
| C | C | C | C | C | C | C |

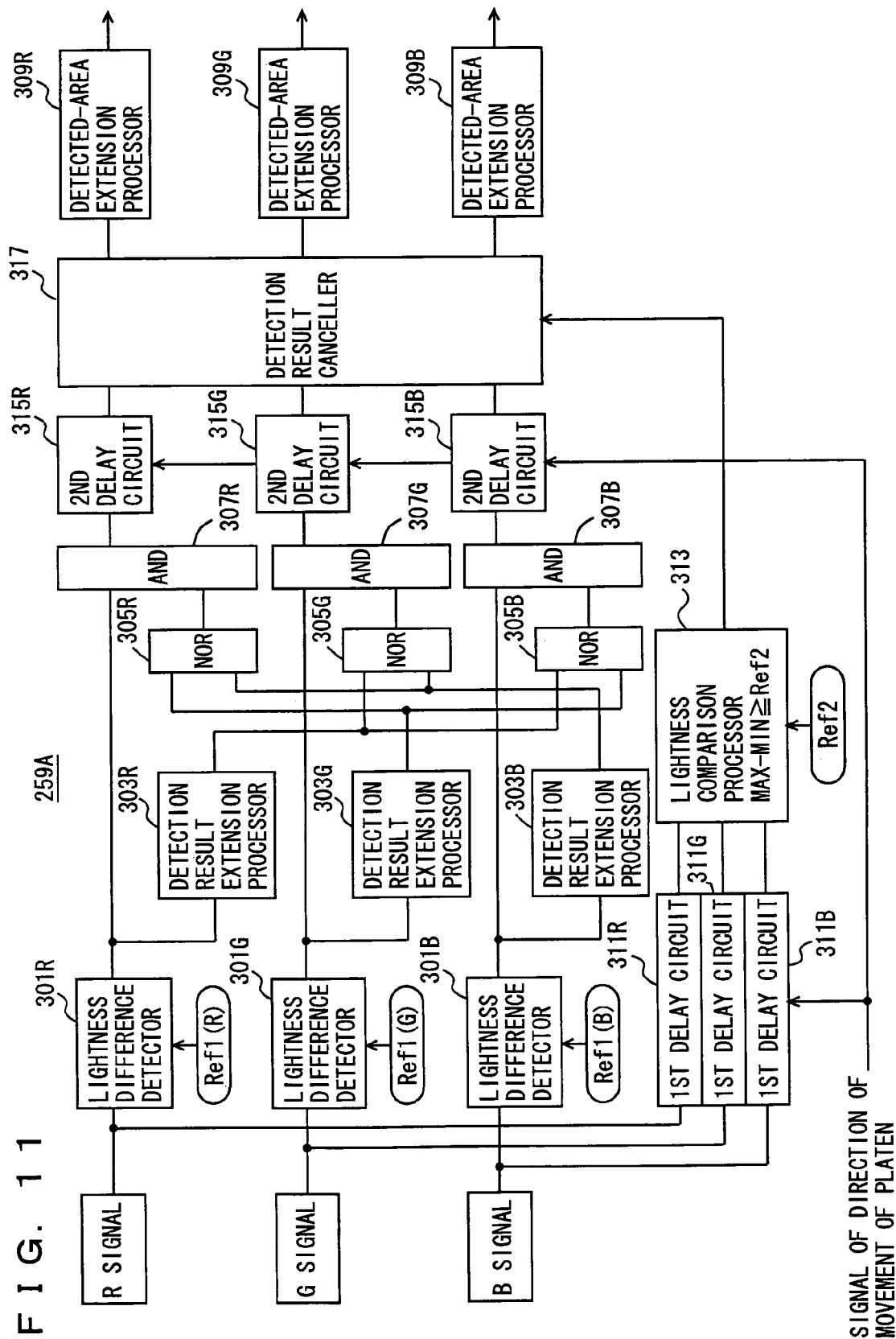

IMAGE READING APPARATUS FOR DETECTING NOISE IN IMAGE DATA

This application is based on Japanese Patent Application No. 2004-285829 filed with the Japan Patent Office on Sep. 30, 2004, the entire content of which is hereby incorporated by reference.

BACKGROUND OF THE INVENTION

1. Field of the Invention

The present invention relates generally to image reading apparatuses and particularly to image reading apparatuses reading an original while transporting it.

2. Description of Related Art

Conventionally digital copiers and similar image reading apparatuses employ a technique referred to as so-called "reading an original while passing the original." More specifically, an original is transported relative to a fixed line sensor in a sub scanning direction orthogonal to the line sensor as the original is read.

Such image reading apparatus is provided with a transparent platen between the original and the line sensor to fix a position at which a transported original is read. The original reflects light which is in turn received via the platen by the line sensor.

As such, if dust, paper particles, flaws or other similar foreign matters (hereinafter generally referred to as "dust") adhered on the platen's reading position, the line sensor will read the dust while reading a transported original. This provides an output image with noise in the form of a line in the sub scanning direction.

Japanese Laid-Open Patent publication No. 2000-278485 describes an image reading apparatus that detects noise caused by dust adhering on a platen glass's reading position from a read image by oscillating the platen in a main scanning direction as the apparatus reads an original. This image reading apparatus detects a specific waveform appearing in an image as noise generated by reading dust.

The image reading apparatus described in Japanese Laid-Open Patent publication No. 2000-278485, however, employs pattern-matching to detect the specific waveform appearing in an image. As such, if an original includes such a pattern, the apparatus would erroneously detect the pattern.

SUMMARY OF THE INVENTION

The present invention has been made to overcome the above disadvantage and contemplates an image reading apparatus capable of detecting with improved precision noise generated in an image by dust existing on a platen.

To achieve the above object the present invention in one aspect provides an image reading apparatus including: at least three line sensors mutually spaced in a sub scanning direction; a platen arranged between the original and the line sensors; a mover moving the platen relative to the line sensors at a rate relative to the line sensors, the rate being different from that of the original relative to the line sensors; an extractor extracting a feature pixel having a predetermined feature from each of at least three data output from the line sensors; and a detector comparing the data output from the line sensors corresponding to a single location on the original to detect the feature pixel extracted from one of the data, as a noise pixel if the feature pixel is not a feature pixel for the other data.

In accordance with the present invention an original is scanned in a sub scanning direction by at least three sensors spaced in the sub scanning direction and between the original and the line sensors there is provided a platen moving at a rate relative to the line sensors, the rate being different from that of the original relative to the line sensors. When the platen has dust adhering thereon, the dust is read by the line sensors sequentially. As the platen is moved at a rate relative to the line sensors, the rate being different from that of the original relative to the line sensors, the dust on the platen is read by each line sensor at a different location in the original. The image reading apparatus compares at least three data corresponding to a single location on the original to detect a feature pixel, extracted from one of the data, as a noise pixel if the feature pixel is not a feature pixel for all of the other data. The image reading apparatus can detect the noise generated by dust existing on the platen from an image of a read original with higher precision.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a perspective view of an MFP including an image reading apparatus in one embodiment of the present invention.

FIG. 3 is a perspective view of a mechanism employed to oscillate a platen.

FIG. 6 shows a position on a platen read by a reader.

FIGS. 10A-10F show an edge extraction filter by way of example.

FIG. 11 is a block diagram showing a configuration of the noise detection processor in an exemplary variation.

DESCRIPTION OF THE PREFERRED EMBODIMENTS

Figure 2:
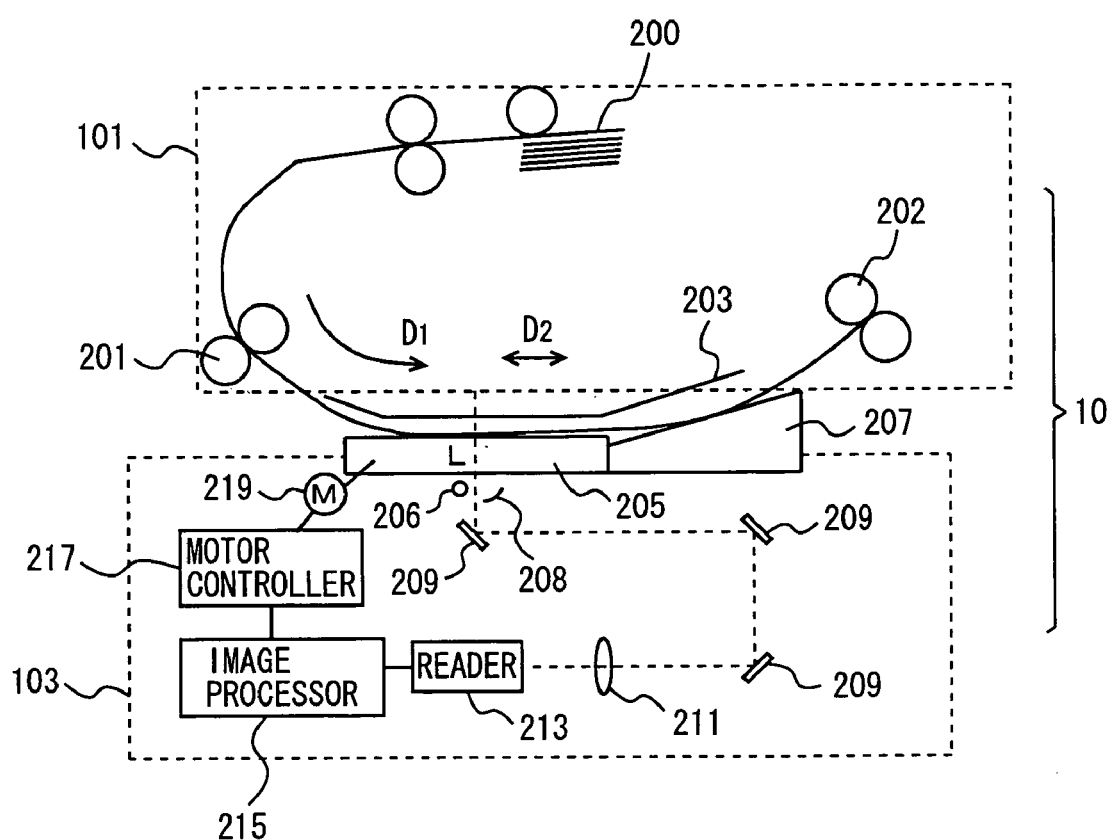
FIG. 2 schematically shows the image reading apparatus's internal structure.

Hereinafter reference will be made to the drawings to describe embodiments of the present invention. In the following description, like components are denoted by like reference characters and also identical in name and function.

FIG. 1 is a perspective view of a multi-function peripheral (MFP) including an image reading apparatus in one embodiment of the present invention. With reference to the figure, the MFP includes an image reading apparatus 10 operative to read an original image, and an image forming apparatus 20 provided under image reading apparatus 10. The MFP forms an image read by image reading apparatus 10 on a sheet of paper or similar recording medium. Furthermore, the MFP includes a communications interface to connect with a facsimile device, a local area network (LAN), a public line or similar network.

FIG. 2 schematically shows an internal configuration of image reading apparatus 10. Image reading apparatus 10 includes an automatic document feeder (ADF) 101 and a main body 103. ADF 101 includes an upper restraint plate 203 guiding a transported original in the vicinity of an original reading position, a timing roller pair 201 transporting the original to the original reading position, and a roller pair 202 transporting the original having moved past the reading position.

Main body 103 includes a platen 205 formed of a transparent member, a sheet passage guide 207 forming a portion of a path of the original, a source of light 206 illuminating the original at the reading position, a reflector member 208 reflecting the light emitted from the source of light, a reader 213 having three line sensors arranged in a sub scanning direction, a reflector mirror 209 arranged to reflect light reflected from the original and guide the reflection of light to reader 213, a lens 211 focusing the reflection of light on reader 213, an image processor 215 processing an electrical signal output from reader 213, a motor 219 operative to oscillate platen 205, and a motor controller 217 operative in response to a control signal received from image processor 215 to control the driving of motor 219.

An original 200 is transported by timing roller pair 201 between platen 205 and upper restraint plate 203 in a direction D1. The original being transported has its image read at a reading position L by reader 213 successively. ADF 101 transports an original in the sub scanning direction, as seen at a reading position L. During the image reading operation, platen 205 is oscillated by motor 219 in a direction D2. Platen 205 oscillates in a direction substantially parallel to the sub scanning direction.

Reader 213 includes three line sensors each having a plurality of photoelectric conversion elements arranged in a main scanning direction substantially perpendicular to the sub scanning direction. The three line sensors have filters, respectively, different in spectral sensitivity and receive light reflected from an original through the filters. More specifically, the sensors have filters transmitting light of waveforms of red (R), green (G) and blue (B). Thus, the line sensor having the filter of red (R) outputs an R signal, an electrical signal indicating an intensity of red light of light reflected from an original, the line sensor having the filter of green (G) outputs a G signal, an electrical signal indicating an intensity of green light of light reflected from the original, and the line sensor having the filter of blue (B) outputs a B signal, an electrical signal indicating an intensity of blue light of light reflected from the original.

The three line sensors are arranged in the sub scanning direction in a predetermined order with a predetermined distance therebetween. In this example, the line sensors are spaced by a distance corresponding to three original reading lines, and arranged, red first, followed by green and then blue as seen in the direction in which an original is transported, although the line sensors may be spaced by different distanced and arranged in different orders.

The three line sensors thus spaced and arranged simultaneously receive at the same timing the light reflected by an original at different locations. As such, the light reflected by the original at a location is initially received by the red light receiving line sensor, subsequently by the green light receiving line sensor, and finally by the blue light receiving line sensor. This delay is adjusted by image processor 215, as will be described later.

Platen 205 is formed of a transparent member, such as a flat plate formed for example of glass, resin or the like.

Note that while in the present embodiment reader 213 is provided with three line sensors, it may be provided with four or more line sensors.

FIG. 3 is a perspective view showing a mechanism employed to oscillate the platen. With reference to the figure, platen 205 is held by a platen holder 221 held slidably in the sub scanning direction by a guide 220 fixed to the main body of image reading apparatus 10. Platen holder 221 has one surface with two arms 222 connected thereto. Arm 222 has the other end provided with a circular hole.

A shaft 224 at portions corresponding to the two arms 222 has two cams 223 attached thereto. Furthermore, shaft 224 has one end with a gear 225 attached thereto. Gear 225 is arranged to mesh with a gear 226 linked by a belt to the motor 219 drive shaft. As motor 219 runs, the motor's rotation is transmitted by the belt to gear 226, and gear 226 thus rotates. As gear 226 rotates, gear 225 and shaft 224 rotate.

Cam 223 is arranged in the circular hole of arm 222. As such, as shaft 224 rotates, the two cams 223 accordingly provide rotation, which is converted to translation movement of platen holder 221.

Note that platen 205 may be oscillated by a mechanism other than that described above. For example, the platen may be oscillated by a mechanism employing a driving source, such as a piston utilizing an electromagnet, air pressure, hydraulic pressure and the like, causing linear movement.

Platen 205 is oscillated parallel to the sub scanning direction. When platen 205 is moving in a direction opposite that in which an original is transported, platen 205 and the original moves in the opposite directions. As such, the speed of platen 205 relative to line sensors 213R, 213G, 213B and that of the original relative to the line sensors are different. In contrast, when platen 205 is moving in the direction in which the original is transported, the speed of platen 205 and that of the original transported are the same in direction. Preferably, they should be different in rate. Note that while herein platen 205 is oscillated parallel to the sub scanning direction, the platen may be oscillated in different directions.

Figure 4A:
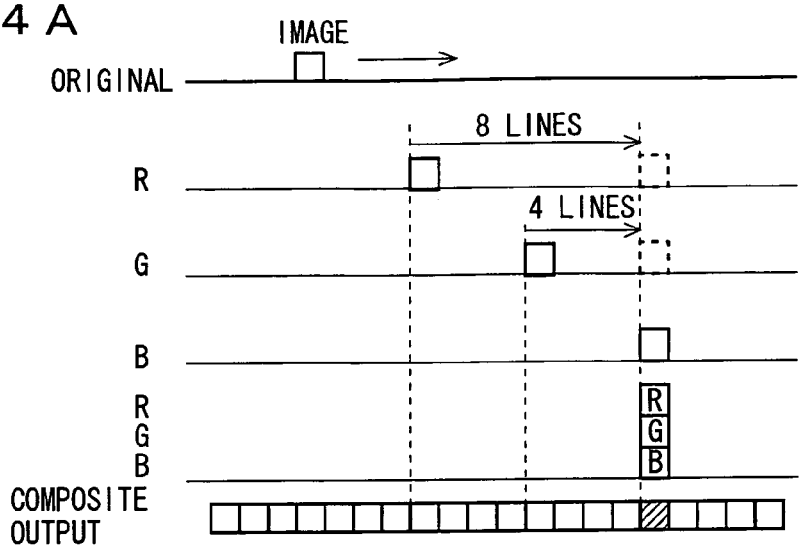
FIGS. 4A-4C are diagrams for illustrating a theory of detecting noise generated by reading dust from a read image.
Figure 4B:
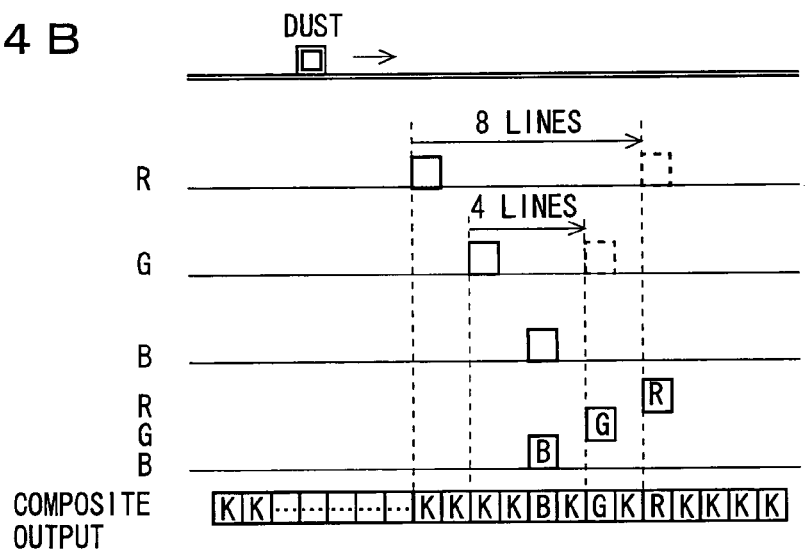
Figure 4C:
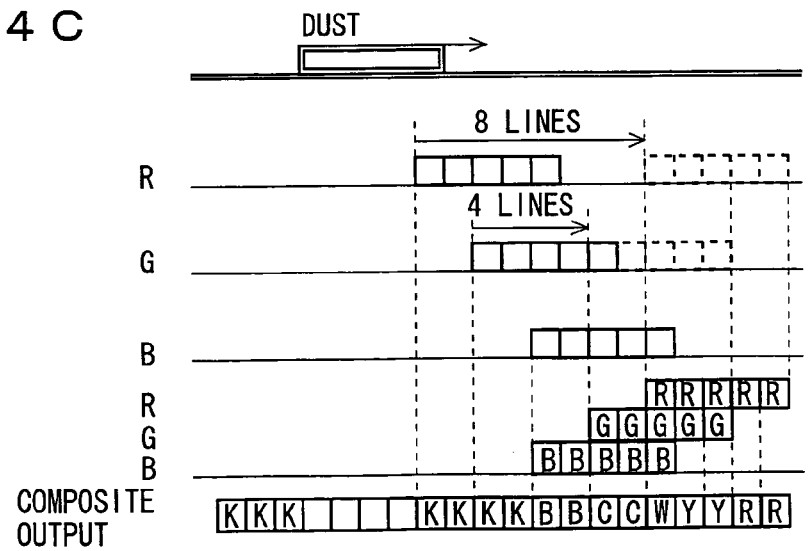

In the present embodiment image reading apparatus 10 detects noise generated by dust adhering on platen 205 from a read image in accordance with a theory as described hereinafter. FIGS. 4A-4C are diagrams for illustrating the theory. For the sake of illustration, an original and platen 205 are transported in the figures in a direction indicated by an arrow, and platen 205 moves at a rate which is the same in direction as and twice in magnitude that at which the original is transported. Furthermore for the sake of illustration the three line sensors are red light, green light and blue light receiving line sensors arranged red first, followed by green and then blue in the direction in which the original is transported, with a distance corresponding to three lines therebetween. R, G and B indicate outputs of the red light, green light and blue light receiving line sensors, respectively.

FIG. 4A is a diagram for illustrating interline correction. The image of a portion of the original is initially read by the red light receiving line sensor arranged most upstream in the direction in which the original is transported. The image is then transported by a distance corresponding to four lines, and read by the green light receiving line sensor. The image is further transported by a distance corresponding to four lines, and read by the blue light receiving sensor.

Thus an image located in an original at a single location is read by three line sensors at different times. As such, the three line sensors output signals offset in timing. Interline correction synchronizes the signals output from the three line sensors so that the signals all correspond to a single location in the original. More specifically, output R is delayed by eight lines and output G is delayed by four lines.

Interline corrected outputs R, G and B are composited to provide a composite output, which corresponds to outputs R, G and B read at a single location in an original and composited together.

FIG. 4B is a diagram for illustrating a composite output provided when dust adhering on a platen is read. The dust adhering on platen 205 is initially read by the red light receiving line sensor arranged most upstream in the direction in which an original is transported. The dust is transported by a distance corresponding to four lines, and read by the green light receiving line sensor. Since platen 205 moves in the same direction as the original at a rate twice that at which the original is transported, the dust moves by four lines in a period of time required for a line sensor to read the original by two lines. As such, between the time point at which the red line sensor reads the dust and that at which the green line sensor reads the dust there is introduced an offset by a period of time corresponding to reading two lines. Furthermore, the dust is transported by a distance corresponding to four lines, and read by the blue light receiving line sensor. Since platen 205 moves in the same direction as the original at a rate twice that at which the original is transported, between the time point at which the green line sensor reads the dust and that at which the blue line sensor reads the dust there is introduced an offset by a period of time corresponding to reading two lines.

By interline correction the red light receiving line sensor reading the dust outputs R delayed by eight lines and the green light receiving line sensor reading the dust outputs G delayed by four lines. As such, interline corrected outputs R, G and B composited together provide a composite output in which outputs R, G and B with the dust read are not composited at the same timing, offset by two lines.

Note that the figure shows a composite output provided when paper particles or similar white dust adhere on platen 205 and a black original is read. Despite that the white dust is read, the composite output is not white but rather an output of blue, green and red divided in three lines.

FIG. 4C is another diagram for illustrating a composite output provided when dust adhering on a platen is read. The figure shows an example of reading dust having a size corresponding to ten lines in the sub scanning direction. Platen 205 moves in the same direction as an original at a rate twice that at which the original is transported. As such, the dust is read as having a size corresponding to five lines.

The dust adhering on platen 205 is initially read by the red light receiving line sensor arranged most upstream in the direction in which the original is transported. The dust is then transported by a distance corresponding to four lines, and read by the green light receiving line sensor. Between the time point at which the red line sensor reads the dust and that at which the green line sensor reads the dust there is introduced an offset by a period of time corresponding to reading two lines. The dust further is transported by a distance corresponding to four lines, and read by the blue light receiving line sensor. Between the time point at which the green line sensor reads the dust and that at which the blue line sensor reads the dust there is introduced an offset by a period of time corresponding to reading two lines.

By interline correction the red light receiving line sensor reading the dust outputs R delayed by eight lines and the green light receiving line sensor reading the dust outputs G delayed by four lines. As such, interline corrected outputs R, G and B composited together provide a composite output in which outputs R, G and B by five lines with the dust read are not composited at the same timing, offset by two lines. Note that the figure shows a composite output provided when paper particles or similar white dust adhere on platen 205 and a black original is read. Despite that the white dust is read, the composite output is an output varying in color, first in blue, followed by cyan, white yellow and then red.

The dust adhering on platen 205 is thus divided in an image into a plurality of lines, which are extracted for each color as a feature point to detect noise. Furthermore, such division also reduces noise caused by reading the dust.

Figure 5:
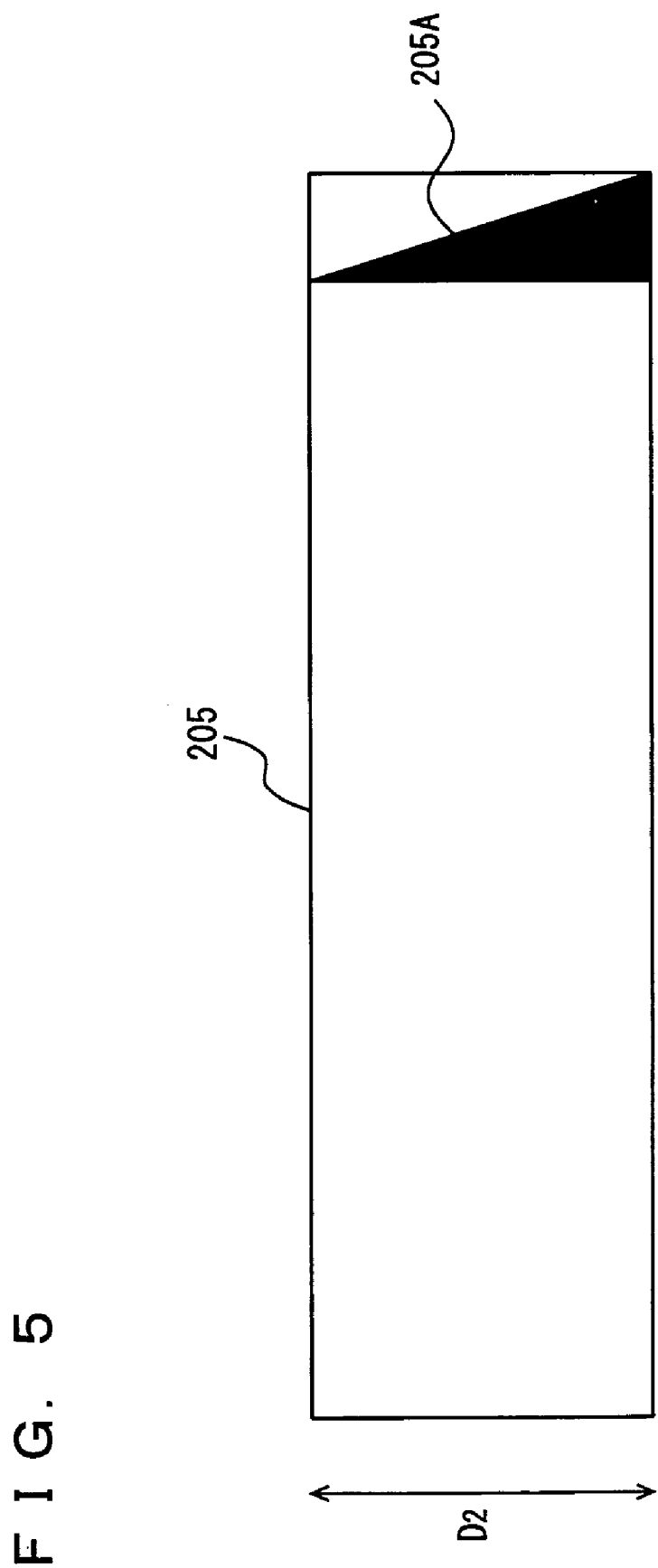
FIG. 5 is a rear plan view of the platen.

FIG. 5 is a plan, rear view of the platen. With reference to the figure, platen 205 has one end with a mark 205A having a single color and a geometry having in the main scanning direction a length varying depending on the position in the sub scanning direction. In this description, mark 205A is a black triangle. Furthermore, mark 205A has one side arranged parallel to one side of platen 205.

Reader 213 or a sensor provided separate from reader 213 and fixed to main body 103 can be used to detect the length of mark 205A in the main scanning direction to detect the position of platen 205 relative to reader 213.

FIG. 6 shows a location on platen 205 read by reader 213. Reader 213 has line sensors 213R, 213G and 213B having filters of red (R), green (G) and blue (B), respectively, arranged in a direction in which an original is transported D1, red first, followed by green and then blue.

Line sensors 213R, 213G and 213B receive light transmitted through platen 205 at regions 205R, 205G and 205B, respectively. Regions 205R, 205G and 205B are arranged to be spaced by three lines. The original initially moves fast region 205R, then region 205G and finally region 205B. As such, light reflected by the original at a location is initially received by the red light receiving line sensor 213R, then the green light receiving line sensor 213G, and finally the blue light receiving line sensor 213B. Line sensors 213R, 213G, 213B spaced by three lines thus will not simultaneously receive light reflected by the original at a single location.

If platen 205 has adhering thereto dust 300 having a maximal length of at most four lines, then dust 300 will not exist at two or more of regions 205R, 205G, 205B concurrently as platen 205 moves oscillating parallel to the sub scanning direction. FIG. 6 shows a case where dust 300 exists at region 205G. In this case, light reflected by dust 300 is received only by line sensor 213G and not received by line sensor 213R or 213B.

Furthermore, as platen 205 oscillates, dust 300 will exists at different regions. More specifically, when platen 205 moves in direction D1, dust 300 initially exists at region 205R, then region 205G and finally region 205B. In contrast, when platen 205 moves in a direction opposite direction D1, dust 300 exists initially at region 205B, then region 205G, and finally region 205R.

As such, light reflected by dust 300 is received in such an order that when platen 205 moves in direction D1 the light is received initially by line sensor 213R, then line sensor 213G and finally line sensor 213B and when platen 205 moves opposite to direction D1 the light is received initially by line sensor 213B, then line sensor 213G, and finally line sensor 213R.

Figure 7:
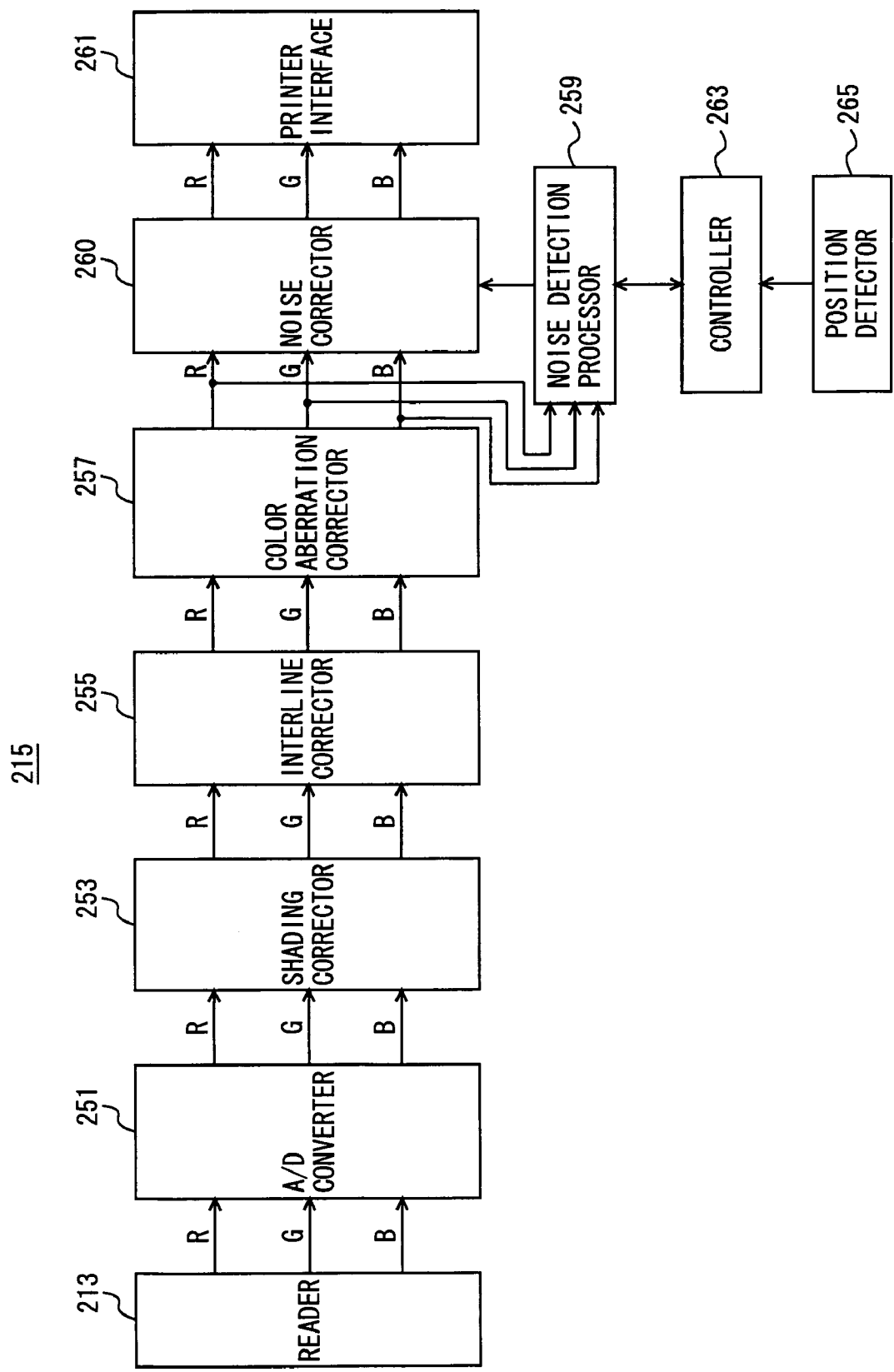
FIG. 7 is a block diagram showing a configuration of an image processor of the image reading apparatus in the present embodiment.

FIG. 7 is a block diagram showing a configuration of the image processor of the image reading apparatus in the present embodiment. With reference to the figure, image processor 215 receives R, G and B signals from reader 213. Image processor 215 includes an analog/digital (A/D) converter 251 receiving an analog signal from reader 213 to convert the analog signal to a digital signal, a shading corrector 253 correcting uneven illumination provided by the source of light 206 or the like, an interline corrector 255 synchronizing the R, G and B signals to be a single line of an original, a color aberration corrector 257 correcting distortion in the main scanning direction introduced by lens 211, a noise detection processor 259 detecting noise from each of the R, G and B signals, a noise corrector 260 effecting a process to correct a noise pixel, a controller 263 generally controlling image processor 215, and a printer interface 261 used to output an image to image forming apparatus 20. Controller 263 has a position detector 265 connected thereto to detect the position of platen 205. Position detector 265 detects a length of mark 205A of platen 205 in the main scanning direction.

Interline corrector 255 delays the R and G signals by eight and four lines, respectively, to synchronize the R, G and B signals to be a single line of the original, since as has been described previously, line sensors 213R, 213G, 213B are spaced in the sub scanning direction by a distance corresponding to three lines.

Noise detection processor 259 receives the R, G and B signals from color aberration corrector 257 and from controller 263 the position of platen 205 and a direction in which platen 205 moves. Noise detection processor 259 detects a noise pixel for each of the R, G and B signals received from color aberration corrector 257, and outputs to noise corrector 260 and controller 263 logical signals of "1" and "0" indicating a noise pixel and a pixel other than a noise pixel, respectively. The detail will be described later.

Noise corrector 260 receives the R, G and B signals from color aberration corrector 257 and from noise detection processor 259 receives for each of the R, G and B signals logical signal of "1" and "0" indicating a noise pixel and a pixel other than a noise pixel, respectively.

Noise corrector 260 determines from logical signals corresponding to the R, G and B signals, respectively, a color of a pixel determined as a noise pixel. More specifically, noise corrector 260 determines a color of a noise pixel successive in the sub scanning direction. Furthermore, if noise pixels are not successive in the sub scanning direction then a color of a pixel existing between two noise pixels is determined, and if the pixels are identically located in the main scanning direction and vary in color in the sub scanning direction in the following order:

(1) CBMRY or YRMBC
(2) CBKRY or YRKBC
(3) RYGCB or BCGYR
(4) RYWCB or BCWYR then the pixels are all determined as noise pixel, wherein R, G, B, C, M, Y, K, and W represent red, green, blue, cyan, magenta, yellow, black, and white, respectively. It should be noted, however, that herein an order in which a color varies is only indicated, and two or more pixels of the same color may be successively provided. For example, it may be CCBBM-MRRYY.

Thus if dust has a size read by a plurality of line sensors concurrently, herein a size corresponding to four or more lines, noise caused by reading the dust can be detected.

Furthermore, noise corrector 260 operates for each of the R, G and B signals in response to a logical signal corresponding thereto to replace a value of a pixel determined as a noise pixel with that of a neighboring, non-noise pixel. This can simply be done by replacing the value of the pixel determined as the noise pixel with an average, maximum or minimum value of a plurality of neighboring non-noise pixels. Noise corrector 260 outputs to the printer interface the R, G and B signals with any noise pixels replaced with a neighboring pixel(s).

Controller 263 receives the position of platen 205 from position detector 265 and from noise detection processor 259 logical signals of "1" and "0" indicating a noise pixel and a pixel other than noise pixel, respectively. Controller 263 determines from these signals the dust's location on platen 205. More specifically, it determines the position of platen 205 in the sub scanning direction from the position of platen 205 and a logical signal's line number, and the position of platen 205 in the main scanning direction from a location of a noise pixel of the logical signal.

The noise detection process will more specifically be described hereinafter. As has been described with reference to FIG. 6, line sensors 213R, 213G and 213B will read different locations on an original at the same timing. Interline corrector 255 synchronizes the R, G and B signals' lines to obtain R, G and B signals having read a single location on the original.

As such, if platen 205 has dust adhering thereon, R, G and B signals having read a single location on an original have one of them affected.

Figure 8:
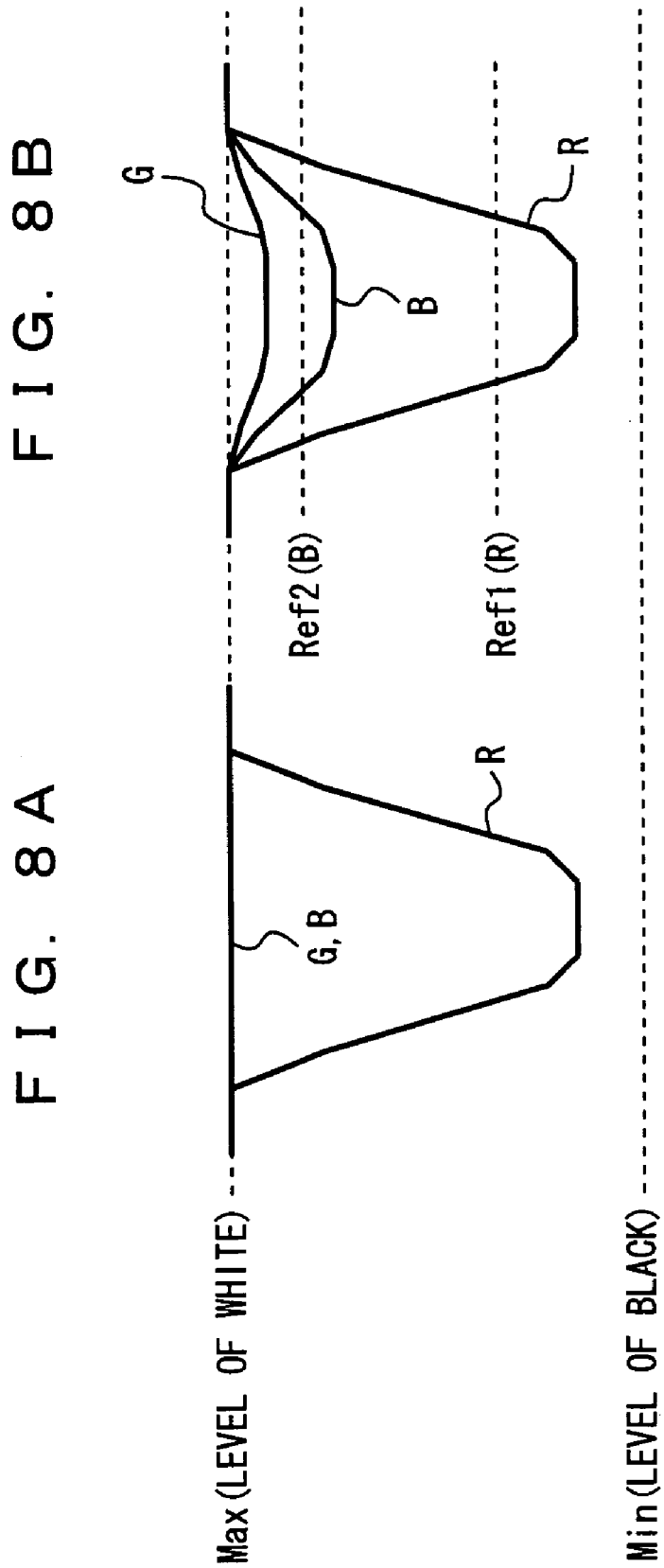
FIGS. 8A and 8B represent one example of RGB signal output from the reader.

FIGS. 8A and 8B represent an example of RGB signal output from the reader. FIG. 8A shows an example of reading a white area of an original with black dust adhering on the platen's region 205R corresponding to line sensor 213R. Line sensor 213R reads a portion of the original with the black dust on region 205R. Subsequently, the portion of the original moves to regions 205G, 205B corresponding to line sensors 213G, 213B, when the dust does not exist on regions 205G, 205B, since the original and platen 205 moves at different rates. As such line sensors 213G, 213B will read the original's white area. Consequently, only an R signal output from line sensor 213R is reduced in lightness and line sensors 213G, 213B output G and B signals high in lightness. Note that herein, "lightness" indicates a value output from the three line sensors 213R, 213G, 213B corresponding to a reflection of light.

The FIG. 8A RGB signals' combination is seldom output when an original is read without dust adhering thereto. A combination closest thereto is a case where an area of cyan, a color complementary to red, is read. FIG. 8B represents RGB signal output from reader 213 when an original's cyan area is read. The R signal significantly drops in lightness, and the G and B signals also drops in lightness.

The FIG. 8A RGB signal and the FIG. 8B RGB signal are significantly different in whether the B and G signals are affected. By detecting this difference, black dust can be detected as noise without detecting a cyan line erroneously as noise. As such, the threshold value for detecting variation in lightness can simply be provided by the smallest one of the following values.

(1) Detecting Dust of Achromatic Color High in Lightness

To prevent a cyan line from being detected erroneously as noise, the difference between a maximum value in lightness (255) and one of the values in lightness output from the line sensors other than line sensor 213R, i.e., line sensors 213G and 213B, reading a color complementary to red, or cyan, can be set as Ref1(G), Ref1(B). To prevent a magenta line from being detected erroneously as noise, the difference between the maximum value in lightness (255) and one of the values in lightness output from the line sensors other than line sensor 213G, i.e., line sensors 213R and 213B, reading a color complementary to green, or magenta, can be set as Ref1(R), Ref1(B). To prevent a yellow line from being detected erroneously as noise, the difference between the maximum value in lightness (255) and one of the values in lightness output from the line sensors other than line sensor 213B, i.e., line sensors 213R and 213G, reading a color complementary to blue, or yellow, can be set as Ref1(R), Ref1(G).

(2) Detecting Dust of Achromatic Color Low in Lightness

To prevent a red line from being detected erroneously as noise, the difference between a minimum value in lightness (0) and one of the values in lightness output from the line sensors other than line sensor 213R, i.e., line sensors 213G and 213B, reading red color, can be set as Ref1(G), Ref1(B). To prevent a green line from being detected erroneously as noise, the difference between the minimum value in lightness (0) and one of the values in lightness output from the line sensors other than line sensor 213G, i.e., line sensors 213R and 213B, reading green color, can be set as Ref1(R), Ref1(B). To prevent a blue line from being detected erroneously as noise, the difference between the minimum value in lightness (0) and one of the values in lightness output from the line sensors other than line sensor 213B, i.e., line sensors 213R and 213G, reading blue color, can be set as Ref1(R), Ref1(G). Thus more than one threshold value Ref1(R), Ref1(G), Ref1(B) are obtained, and a minimum value thereof can simply be used.

While herein black dust is detected as noise, dust of achromatic color other than black can also be detected, since any achromatic dust affects all of R, G and B signals.

Furthermore, while herein a white original is read by way of example, an original of any color other than white may be read.

Figure 9:
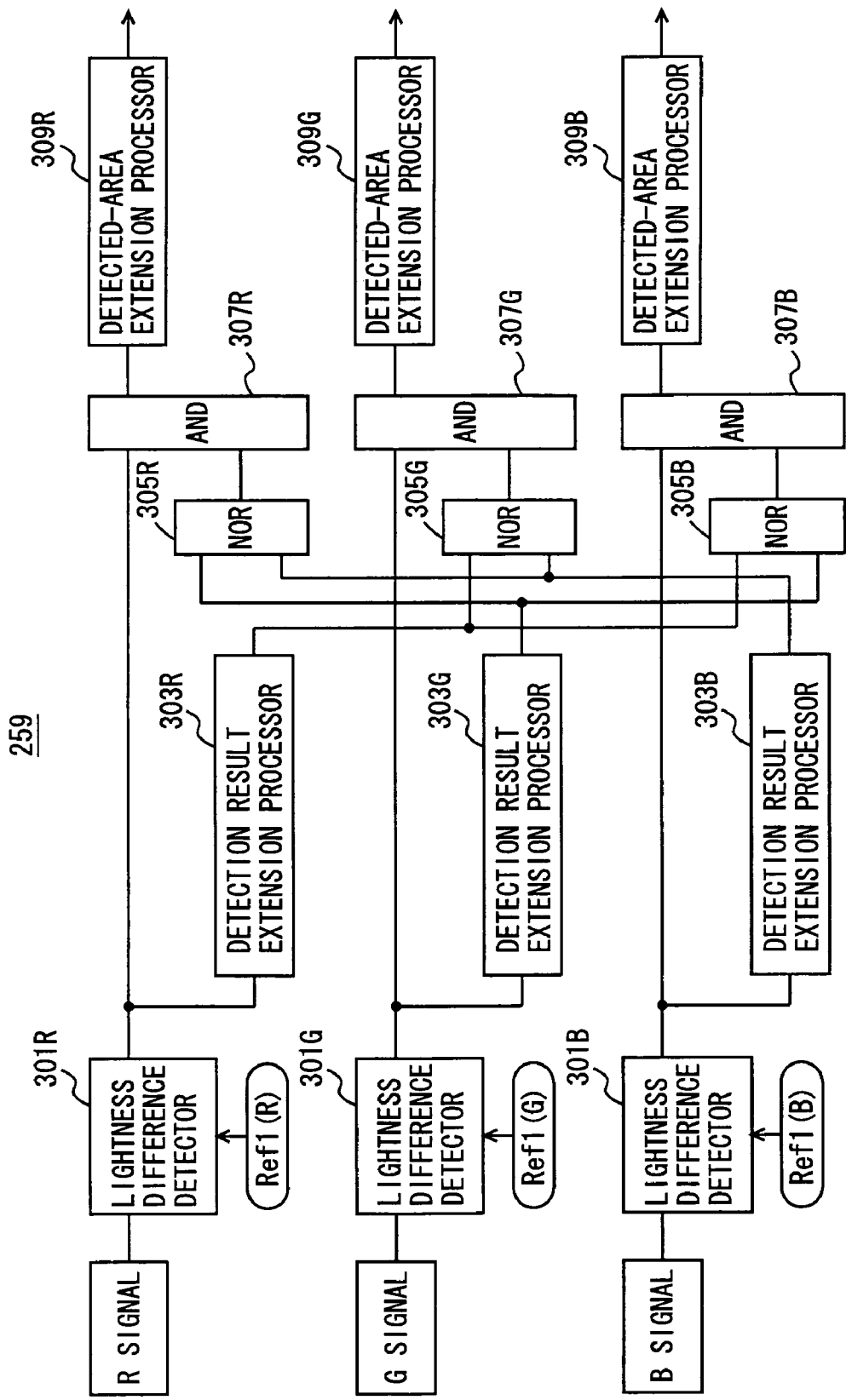
FIG. 9 is a block diagram showing a configuration of a noise detection processor of the image reading apparatus in the present embodiment.

FIG. 9 is a block diagram showing a configuration of the noise detection processor of the image reading apparatus in the present embodiment. With reference to the figure, noise detection processor 259 includes lightness difference detectors 301R, 301G, 301B extracting from R, G and B signals, respectively, a region having a predetermined feature, detection result extension processors 303R, 303G, 303B extending the region extracted by lightness difference detectors 301R, 301G, 301B to a vicinity thereof, NOR devices 305R, 305G, 305B, AND devices 307R, 307G, 307B, and detected-area extension processors 309R, 309G, 309B.

R, G, B signals are input to noise detection processor 259, one line at a time, sequentially. Note that the R, G and B signals may be input collectively by a plurality of lines or an entire image.

Lightness difference detector 301R receives the R signal and threshold value Ref1(R) and extracts from the R signal a region having the predetermined feature. This region is a region having a limited variation in lightness and a difference in lightness of at least threshold Ref1(R) from a region surrounding it. Such region is only required to have a size of at least one pixel. In this description a pixel included in a region having the predetermined feature will be referred to as a feature pixel.

The region having the predetermined feature may be extracted by employing an edge extraction filter. More than one edge extraction filter are prepared for sizes of edge regions, respectively, and a value obtained as a result of filtering is compared with threshold value Ref1(R). A pixel satisfying a condition with threshold value Ref1(R) is determined as a center pixel of an edge region and from an edge extraction filter satisfying that condition the edge region's size is obtained.

FIGS. 10A-10F represent the edge extraction filter by way of example. FIG. 10A represents an edge extraction filter used to detect an edge region of a size of one pixel when an R signal is input, one line at a time. FIG. 10B represents an edge extraction filter used to detect an edge region of a size of one pixel when an R signal is input in a plurality of lines correctively.

FIG. 10C represents an edge extraction filter used to detect an edge region of a size of three pixels when an R signal is input, one line at a time. FIG. 10D represents an edge extraction filter used to detect an edge region of a size of three pixels when an R signal is input in a plurality of lines correctively.

FIG. 10E represents an edge extraction filter used to detect an edge region of a size of five pixels when an R signal is input, one line at a time. FIG. 10D represents an edge extraction filter used to detect an edge region of a size of five pixels when an R signal is input in a plurality of lines correctively.

These edge extraction filters are established under the following conditions:

(1) An edge region high in lightness is extracted when an average in lightness of pixels A and B minus that in lightness of pixel C equals at least threshold value Ref1(R):

$$(\text{Average of Pixels } A \text{ and } B) - (\text{Average of Pixel } C) > \text{Ref1}(R).$$

In that case, the center pixel is one of pixels A, B and C that is the highest in lightness.

(2) An edge region low in lightness is extracted when an average in lightness of pixel C minus that in lightness of pixels A and B equals at least threshold value Ref1(R):

$$(\text{Average of Pixel } C) - (\text{Average of Pixels } A \text{ and } B) > \text{Ref1}(R).$$

In that case, the center pixel is one of pixels A, B and C that is the lowest in lightness.

G and B signals can also be handled with an edge extraction filter similar to that used for the R signal.

With reference again to FIG. 9, the feature pixel extracted by lightness difference detector 301R is represented by a logical signal of "1" and a pixel other than the feature pixel is represented by a logical signal of "0" and thus output to AND device 307R and detection result extension processor 303R.

Detection result extension processor 303R sets a pixel neighboring the feature pixel extracted by lightness difference detector 301R as a feature pixel to extend a region having the predetermined feature. In other words, a pixel that exists in a vicinity of a pixel of "1" in value as represented by a logical signal received from lightness difference detector 301R and has a value of "0" is changed to "1". Noise can be detected with higher precision. A logical signal having contributed to extended region is output to NOR devices 305G, 305B.

Lightness difference detector 301G receives the G signal and threshold value Ref1(G) and extracts from the G signal a region having the predetermined feature. This region is a region having a limited variation in lightness and a difference in lightness of at least threshold Ref1(G) from a region surrounding it.

The feature pixel extracted by lightness difference detector 301G is represented by a logical signal of "1" and a pixel other than the feature pixel is represented by a logical signal of "0" and thus output to AND device 307G and detection result extension processor 303G.

Detection result extension processor 303G sets a pixel neighboring the feature pixel extracted by lightness difference detector 301G as a feature pixel to extend a region having the predetermined feature. A logical signal having contributed to an extended region is output to NOR devices 305R, 305B.

Lightness difference detector 301B receives the B signal and threshold value Ref1(B) and extracts from the B signal a region having the predetermined feature. This region is a region having a limited variation in lightness and a difference in lightness of at least threshold Ref1(B) from a region surrounding it.

The region having the predetermined feature may be extracted by employing an edge extraction filter. More than one edge extraction filter are prepared for sizes of edge regions, respectively, and a value obtained as a result of filtering is compared with threshold value Ref1(B). A pixel satisfying a condition with threshold value Ref1(B) is determined as a center pixel of an edge region and from an edge extraction filter satisfying that condition the edge region's size is obtained.

The feature pixel extracted by lightness difference detector 301B is represented by a logical signal of "1" and a pixel other than the feature pixel is represented by a logical signal of "0" and thus output to AND device 307B and detection result extension processor 303B.

Detection result extension processor 303B sets a pixel neighboring the feature pixel extracted by lightness difference detector 301B as a feature pixel to extend a region having the predetermined feature. A logical signal having contributed to an extended region is output to NOR devices 305R, 305G.

NOR device 305R receives from each of detection result extension processor 303G, 303B a logical signal having contributed to an extended region. NOR device 305R outputs to AND device 307R a logical signal corresponding to an inversion of an OR of two received logical signals. More specifically, a pixel which is not a feature pixel for either a G or B signal is represented by a logical signal of "1" for output and a pixel which is a feature pixel for at least one of the signals is represented by a logical signal of "0" for output.

AND device 307R outputs to detected-area extension processor 309R an AND of a logical signal received from lightness difference detector 301R and that received from NOR device 305R. More specifically, a pixel which is a feature pixel for an R signal and not an extended feature pixel for either a B or G signal is represented by a logical signal of "1" and a pixel different therefrom is represented by a logical signal of "0" for output. A pixel of "1" in value as represented by this logical signal indicates a noise pixel. Thus by NOR device 305R and AND device 307R a feature pixel extracted from an R signal that has not been extracted as a feature pixel for either a G or B signal is determined as a noise pixel.

If detected-area extension processor 309R receives a logical signal of "1" from AND device 307R for a pixel, detected-area extension processor 309R sets a pixel that exists in a vicinity of the pixel corresponding to the "1" to a "1" to extend a noise pixel's range. This is done to provide improved precision with which a noise pixel is corrected. The noise pixel extended in range is represented by a logical signal of "1" which is in turn output to noise corrector 260.

NOR device 305G receives from each of detection result extension processors 303R, 303B a logical signal having contributed to an extended region. NOR device 305G outputs to AND device 307G a logical signal corresponding to an inversion of an OR of two received logical signals. More specifically, a pixel which is not a feature pixel for either an R or B signal is represented by a logical signal of "1" for output and a pixel which is a feature pixel for at least one of the signals is represented by a logical signal of "0" for output.

AND device 307G outputs to detected-area extension processor 309R an AND of a logical signal received from lightness difference detector 301G and that received from NOR device 305G. More specifically, a pixel which is a feature pixel for a G signal and not an extended feature pixel for either a R or B signal is represented by a logical signal of "1" and a pixel different therefrom is represented by a logical signal of "0" for output. A pixel of "1" in value as represented by this logical signal indicates a noise pixel. Thus by NOR device 305G and AND device 307G a feature pixel extracted from a G signal that has not been extracted as a feature pixel for either an R or B signal is determined as a noise pixel.

If detected-area extension processor 309G receives a logical signal of "1" from AND device 307G for a pixel, detected-area extension processor 309G sets a pixel that exists in a vicinity of the pixel corresponding to the "1" to a "1" to extend a noise pixel's range. This is done to provide improved precision with which a noise pixel is corrected. The noise pixel extended in range is represented by a logical signal of "1" which is in turn output to noise corrector 260.

NOR device 305B receives from each of detection result extension processors 303R, 303G a logical signal having contributed to an extended region. NOR device 305B outputs to AND device 307B a logical signal corresponding to an inversion of an OR of two received logical signals. More specifically, a pixel which is not a feature pixel for either an R or G signal is represented by a logical signal of "1" for output and a pixel which is a feature pixel for at least one of the signals is represented by a logical signal of "0" for output.

AND device 307B outputs to detected-area extension processor 309B an AND of a logical signal received from lightness difference detector 301B and that received from NOR device 305B. More specifically, a pixel which is a feature pixel for a B signal and not an extended feature pixel for either an R or G signal is represented by a logical signal of "1" and a pixel different therefrom is represented by a logical signal of "0" for output. A pixel of "1" in value as represented by this logical signal indicates a noise pixel. Thus by NOR device 305B and AND device 307B a feature pixel extracted from a B signal that has not been extracted as a feature pixel for either an R or G signal is determined as a noise pixel.

If detected-area extension processor 309B receives a logical signal of "1" from AND device 307B for a pixel, detected-area extension processor 309B sets a pixel that exists in a vicinity of the pixel corresponding to the "1" to a "1" to extend a noise pixel's range. This is done to provide improved precision with which a noise pixel is corrected. The noise pixel extended in range is represented by a logical signal of "1" which is in turn output to noise corrector 260.

Thus the image reading apparatus 10 noise detection processor 259 extracts a feature pixel from each of R, G and B signals output from the three line sensors 213R, 213G, 213B, and sets as a noise pixel a feature pixel extracted from one of R, G and B signals. Thus noise caused by dust existing on a platen can be detected from an image obtained by reading an original.

Noise Detection Processor in Exemplary Variation

When dust of achromatic color reflects light, the light is received by line sensors 213R, 213G, 213B at different times. The line sensors, however, should output lightness close in value.

In this exemplary variation if pixels detected from R, G and B signals as noise pixels, respectively, have a large difference in lightness the detection is cancelled.

FIG. 11 is a block diagram showing a configuration of the noise detection processor in the exemplary variation. It is different from the FIG. 9 noise detection processor 259 in that first delay circuits 311R, 311G, 311B, a lightness comparison processor 313, second delay circuits 315R, 315G, 315B, and detection result canceller 317 are additionally introduced. The remainder has the same configuration as the FIG. 9 noise detection processor.

The first delay circuits 311R, 311G, 311B receive from controller 263 a direction in which platen 205 moves, and delays R, G and B signals so that a corresponding noise pixel to have an identical position. The number of lines to be delayed depends on in which direction the platen moves.

In Case with Platen Moving in Direction Opposite to That of Original

As has been described previously, a noise pixel is detected first for a B signal, then a G signal and finally for an R signal. Accordingly, a B signal of a line including a detected noise pixel is delayed until a line including a noise pixel of an R signal that corresponds to the noise pixel of the B signal is output. Furthermore, a G signal of a line including a detected noise pixel is delayed until a line including a noise pixel of an R signal that corresponds to the noise pixel of the G signal is output.

The first delay circuit 311B delays a B signal by a number of lines to be delayed as determined by the following equation (1):

$$B \text{ signal's number of lines to be delayed} = (\text{line interval} \times (\text{system rate/platen movement rate}) + \text{line interval}) \times 2 \quad (1),$$

wherein the system rate indicates a rate at which an original is transported, and the line interval is an interval of line sensors 213R, 213G, 213B (unit: line).

The first delay circuit 311G delays a G signal by a number of lines to be delayed as determined by the following equation (2):

$$G \text{ signal's number of lines to be delayed} = (\text{line interval} \times (\text{system rate/platen movement rate}) + \text{line interval}) \quad (2).$$

Note that noise's length (unit: line) is represented by the following equation (3):

$$\text{Noise's length} = \text{dust's size} \times (\text{system rate/platen movement rate}) \quad (3).$$

In Case with Platen Moving in the Same Direction as Original

As has been described previously, a noise pixel is detected first for a B signal, then a G signal and finally for an R signal. Accordingly, an R signal of a line including a detected noise pixel is delayed until a line including a noise pixel of a B signal that corresponds to the noise pixel of the R signal is output. Furthermore, a G signal of a line including a detected noise pixel is delayed until a line including a noise pixel of a B signal that corresponds to the noise pixel of the G signal is output.

The first delay circuit 311R delays an R signal by a number of lines to be delayed as determined by the following equation (4):

$$R \text{ signal's number of lines to be delayed} = (\text{line interval} \times (\text{system rate/platen movement rate}) - \text{line interval}) \times 2 \quad (4).$$

The first delay circuit 311G delays a G signal by a number of lines to be delayed as determined by the following equation (5):

$$G \text{ signal's number of lines to be delayed} = (\text{line interval} \times (\text{system rate/platen movement rate}) - \text{line interval}) \quad (5).$$

The second delay circuits 315R, 315G, 315B delay logical signals received from AND circuits 307R, 307G, 307B, respectively. The second delay circuits 315R, 315G, 315B delay the same number of lines as the first delay circuits 311R, 311G, 311B.

Lightness comparison processor 313 receives delayed R, G and B signals from the first delay circuits 311R, 311G, 311B, and threshold value Ref2. Lightness comparison processor 313 outputs to detection result canceller 317 a logical signal of "1" if a corresponding pixel's maximal and minimal values in lightness has a difference of at least threshold value Ref2, otherwise lightness comparison processor 313 outputs a logical signal of "0" to detection result canceller 317. A logical signal with this value being "1" is referred to as a cancel signal.

Detection result canceller 317 receives from the second delay circuits 315R, 315G, 315B a logical signal of "1" representing a noise pixel, and receives from lightness comparison processor 313 a logical signal including the cancel signal. Detection result canceller 317 sets as "0" a logical signal of "1" representing a noise pixel received from each of the second delay circuits 315R, 315G, 315B when a corresponding logical signal received from lightness comparison processor 313 is a cancel signal of "1". More specifically, pixels determined as noise pixel for each of R, G and B signals. If the pixels corresponding to each other have difference in lightness exceeding a predetermined value, the pixels are not determined as a noise pixel. A noise pixel can thus be detected with higher precision.

Note that while the present embodiment has been described with reader 213 fixed to main body 103 by way of example, alternatively, the present invention is also applicable to moving reader 213 for scanning. For example, the upper restraint plate is of monochromatic color of white or black, and reader 213 or the source of light 206, reflector mirror 209 and reflector member 208 are moved in the sub scanning direction for scanning. During the scan, platen 205 can be oscillated in the sub scanning direction to detect dust adhering on platen 205.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus comprising:
   at least three line sensors mutually spaced in a sub scanning direction to scan an original in the sub scanning direction, wherein outputs of the at least three line sensors are composited together to form an image of the original;
   a platen arranged between the original and said at least three line sensors;
   a mover moving said platen at a rate relative to said at least three line sensors, said rate being different from a rate of movement of the original relative to said at least three line sensors;
   an extractor configured to extract a feature pixel having a predetermined feature from any of at least three data output corresponding to said at least three line sensors; and
   a detector configured to identify a noise pixel by comparing said at least three data corresponding to a single location on the original and identifying the feature pixel as noise pixel if said feature pixel is detected for one of said at least three data and is not detected as a feature pixel for each of the other at least three data,
   wherein said extractor includes a region extractor extracting a region having a limited variation in lightness and a difference from a neighboring region in lightness of at least a predetermined value, and extracts as said feature pixel a pixel included in a region extracted.

2. The image reading apparatus of claim 1, further comprising an interline corrector synchronizing said at least three data output by said at least three line sensors to be values of pixels reading a single location on the original, wherein said at least three data synchronized by said interline corrector are inputted, one line at a time, sequentially.

3. The image reading apparatus of claim 1, wherein said detector further includes an extender setting as a feature pixel a pixel neighboring said feature pixel, and detects said feature pixel extracted from one of said at least three data, as a noise pixel if said feature pixel is not a feature pixel extended by said extender for said at least three data other than said one of said at least three data.

4. The image reading apparatus of claim 1, wherein said at least three sensors each include a filter different in spectral sensitivity to receive light reflected from the original through said filter.

5. The image reading apparatus of claim 1, further comprising an original transporter transporting the original while said at least three line sensors scan the original.

6. The image reading apparatus of claim 1, wherein said mover oscillates said platen in the sub scanning direction.

7. The image reading apparatus of claim 1, further comprising a determiner determining a pixel to be corrected, said pixel to be corrected being a noise pixel detected by said detector and a pixel neighboring said noise pixel detected.

8. The image reading apparatus of claim 1, further comprising:

a position detector detecting said platen's position; and a location determiner determining a location of a source of noise on said platen from the position detected by said position detector and a location of said noise pixel detected by said detector.

* * * * *